US009439097B2

(12) United States Patent
Zhang et al.

(10) Patent No.: US 9,439,097 B2
(45) Date of Patent: Sep. 6, 2016

(54) SELECTIVE SIGNALING INFORMATION SHARING FOR COMP ENHANCEMENT

(71) Applicants: Min Zhang, Swindon (GB); Matthew Baker, Canterbury (GB); Hakon Helmers, Sceaux (FR); Philippe Godin, Paris (FR); Fangchen Cheng, Randolph, NJ (US)

(72) Inventors: Min Zhang, Swindon (GB); Matthew Baker, Canterbury (GB); Hakon Helmers, Sceaux (FR); Philippe Godin, Paris (FR); Fangchen Cheng, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 28 days.

(21) Appl. No.: 14/176,670

(22) Filed: Feb. 10, 2014

(65) Prior Publication Data
US 2015/0230113 A1 Aug. 13, 2015

(51) Int. Cl.
*H04W 24/10* (2009.01)
*H04L 12/26* (2006.01)
*H04W 28/02* (2009.01)
*H04L 5/00* (2006.01)

(52) U.S. Cl.
CPC ............ *H04W 24/10* (2013.01); *H04L 5/0035* (2013.01); *H04L 5/0091* (2013.01); *H04L 43/06* (2013.01); *H04W 28/02* (2013.01)

(58) Field of Classification Search
CPC .............................. H04L 47/10; H04L 43/50
USPC ........................................................ 370/252
See application file for complete search history.

(56) References Cited

U.S. PATENT DOCUMENTS

2008/0188236 A1* 8/2008 Alles et al. ................ 455/456.1
2011/0237270 A1* 9/2011 Noh et al. ..................... 455/450
2012/0135766 A1* 5/2012 Garavaglia et al. .......... 455/509
2012/0282934 A1* 11/2012 Simonsson et al. .......... 455/446
2012/0302240 A1* 11/2012 Tamaki et al. ................ 455/436
2012/0320819 A1* 12/2012 Kim et al. ..................... 370/315
2013/0039203 A1* 2/2013 Fong et al. .................... 370/252
2013/0176887 A1 7/2013 Seo et al.

(Continued)

FOREIGN PATENT DOCUMENTS

EP 2337400 A1 6/2011
EP 2800437 A1 * 11/2014

OTHER PUBLICATIONS

International Search Report PCT/ISA/210 and Written Opinion PCT/ISA/237 for International Application No. PCT/US2015/013162 dated Apr. 7, 2015.

*Primary Examiner* — Melvin Marcelo
*Assistant Examiner* — Peter Solinsky
(74) *Attorney, Agent, or Firm* — Harness, Dickey & Pierce, P.L.C.

(57) ABSTRACT

A method of facilitating coordinated multi-point communication (CoMP) in a wireless communications network including at least a first base station (BS) and a second BS, a plurality of user equipment (UEs) being associated with the second BS, includes generating, at the first BS, a status request message for requesting the second BS to report one or more types of status information, the status request message including at least one of an aggregation indicator and conditional reporting indicator, the aggregation indicator specifying whether the second BS is to report individual measurements or aggregated measurements to the first BS, the conditional reporting indicator indicating to the second BS to report measurements corresponding to the one or more types of resource status information to the first BS only when one or more conditions are met; and sending the status request message to the second BS.

20 Claims, 4 Drawing Sheets

(56) References Cited

U.S. PATENT DOCUMENTS

| | | | |
|---|---|---|---|
| 2013/0258874 A1* | 10/2013 | Khoshnevis et al. | 370/252 |
| 2013/0288730 A1* | 10/2013 | Gomadam et al. | 455/509 |
| 2013/0322273 A1* | 12/2013 | Etemad et al. | 370/252 |
| 2013/0322278 A1* | 12/2013 | Lee et al. | 370/252 |
| 2014/0036809 A1* | 2/2014 | Xu et al. | 370/329 |
| 2014/0133340 A1* | 5/2014 | Zhou et al. | 370/252 |
| 2014/0146748 A1* | 5/2014 | Tarokh et al. | 370/328 |
| 2014/0153526 A1* | 6/2014 | Mazzarese | 370/329 |
| 2014/0162717 A1* | 6/2014 | Liu | 455/522 |
| 2014/0286219 A1* | 9/2014 | Siomina et al. | 370/311 |
| 2014/0334333 A1* | 11/2014 | Xu et al. | 370/252 |
| 2014/0362793 A1* | 12/2014 | Chai et al. | 370/329 |
| 2015/0056995 A1* | 2/2015 | Baillargeon | 455/436 |
| 2015/0063095 A1* | 3/2015 | Deng et al. | 370/221 |
| 2015/0092768 A1* | 4/2015 | Ng et al. | 370/350 |

* cited by examiner

SELECTIVE SIGNALING INFORMATION SHARING FOR COMP ENHANCEMENT

BACKGROUND OF THE INVENTION

1. Field

The present invention relates generally to signaling information for facilitating coordination between nodes of a wireless communications network.

2. Related Art

For wireless communications networks including, for example, 4G long term evolution (LTE) networks, in order to support coordinated multi-point communication (CoMP) with non-ideal backhaul, data information including, for example, channel state information (CSI), reference signal receive power (RSRP), and perceived throughput of the UEs may be signaled from a coordinated evolved node-B (eNB) to a coordination node (which may be another eNB). This signaled UE-specific information may be used by the coordination node to determine scheduling constraints for each coordinated eNB.

A proper decision regarding scheduling constraints may balance the risk of loss of scheduling flexibility with the gain of global coordination. In order for the coordination node to make a proper decision regarding scheduling constraints, it is desirable for the coordination node to know substantial amounts of information about the cells of the eNBs from which the coordination node is receiving all latest status information of the user equipment (UEs) attached to those cells.

SUMMARY OF THE INVENTION

One or more embodiments relate to a method and apparatus for signaling information to facilitate coordination between nodes of a wireless communications network including, for example, a wireless communications network implementing a coordinated multi-point communication (CoMP) enhancement.

According to at least one example embodiment, a method of facilitating coordinated multi-point communication (CoMP) in a wireless communications network including at least a first base station (BS) and a second BS, a plurality of user equipment (UEs) being associated with the second BS, includes generating, at the first BS, a status request message for requesting the second BS to report one or more types of status information, the status request message including at least one of an aggregation indicator and conditional reporting indicator, the aggregation indicator being an indicator that specifies whether the second BS is to report individual measurements or aggregated measurements to the first BS, the conditional reporting indicator being an indicator that indicates to the second BS to report measurements corresponding to the one or more types of resource status information to the first BS only when one or more first conditions are met; sending the status request message to the second BS; and receiving, at the first BS from the second BS, a status response message in response to the sent status request message, the status response message including only measurements that conform to the at least one of an aggregation indicator and conditional reporting indicator.

The generated status request message may include the conditional reporting indicator, the conditional reporting indicator indicates to the second BS to report only measurements that correspond to UEs, from among the plurality of UEs, that meet the one or more first conditions.

One of the one or more first conditions may be a threshold value or range corresponding to a first information type from among the one of the one or more types of resource status information, and the condition reporting indicator may indicate to the second BS to report only measurements of UEs, from among the plurality of UEs, having measurements of the first information type that have a desired relationship with the threshold value or range.

The generated status request message may include the aggregation indicator, and the aggregation indicator may specify whether the second BS is to report individual measurements corresponding, respectively, to individual UEs, from among the plurality of UEs, or report one or more aggregated measurements corresponding, respectively, to one or more groups of UEs, from among the plurality of UEs.

The aggregation indicator may indicate to the second BS to report an aggregated measurement of a first information type from among the one of the one or more types of resource status information, the aggregated measurement being an average of a plurality of measurements of the first information type, the plurality of measurements corresponding, respectively, to a group of UEs from among the plurality of UEs.

The wireless communications network may include long term evolution (LTE) radio access technology, the first and second BSs may be evolved Node-Bs (eNBs), and the sending the status request message may include sending the status request message from the first eNB to the second eNB through an X2 link.

According to at least one example embodiment, a method of facilitating coordinated multi-point communication (CoMP) in a wireless communications network including at least a first base station (BS) and a second BS, a plurality of user equipment (UEs) being associated with the second BS, includes receiving, at the second BS from the first BS, a status request message requesting the second BS to report one or more types of status information, the status request message including at least one of an aggregation indicator and conditional reporting indicator, the aggregation indicator being an indicator that specifies whether the second BS is to report individual measurements or aggregated measurements to the first BS, the conditional reporting indicator being an indicator that indicates to the second BS to report measurements corresponding to the one or more types of resource status information to the first BS only when one or more first conditions are met; selecting one or more UEs, from among the plurality of UEs, based on the report control information; generating, at the second BS, a status response message based on measurements corresponding only to the selected one or more UEs; and sending the status response message from the second BS to the first BS.

The received status request message may include the conditional reporting indicator, and the selecting one or more UEs may include selecting only one or more UEs, from among the plurality of UEs, that meet the one or more first conditions.

One of the one or more first conditions may be a threshold value or range corresponding to a first information type from among the one of the one or more types of resource status information, and the selecting one or more UEs may include selecting only one or more UEs, from among the plurality of UEs, having measurements of the first information type that have a desired relationship with the threshold value or range.

The received status request message may include the aggregation indicator, and the generating the status response message may include the second BS selecting between including, in the generated status report, individual measurements corresponding, respectively, to individual UEs, from among the plurality of UEs, and including, in the generated status report, one or more aggregated measurements corresponding, respectively, to one or more groups of UEs, from among the plurality of UEs, the selection being based on the aggregation indicator.

Based on the aggregation indicator, the generating a status response message may include including, in the status response message, an aggregated measurement of a first information type from among the one of the one or more types of resource status information, the aggregated measurement being an average of a plurality of measurements of the first information type, the plurality of measurements corresponding, respectively, to a group of UEs from among the plurality of UEs.

The wireless communications network may include long term evolution (LTE) radio access technology, the first and second BSs may be evolved Node-Bs (eNBs), and the sending the status response message may include sending the status response message from the second eNB to the first eNB through an X2 link.

According to at least one example embodiment, a network element includes a processor, the network element being programmed such that the processor executes operations for facilitating coordinated multi-point communication (CoMP) in a wireless communications network including at least a first base station (BS) and a second BS, the network element being the first BS, a plurality of user equipment (UEs) being associated with the second BS, the operations including, generating a status request message for requesting the second BS to report one or more types of status information, the status request message including at least one of an aggregation indicator and conditional reporting indicator, the aggregation indicator being an indicator that specifies whether the second BS is to report individual measurements or aggregated measurements to the first BS, the conditional reporting indicator being an indicator that indicates to the second BS to report measurements corresponding to the one or more types of resource status information to the first BS only when one or more first conditions are met, sending the status request message to the second BS, and receiving, from the second BS, a status response message in response to the sent status request message, the status response message including only measurements that conform to the at least one of an aggregation indicator and conditional reporting indicator.

According to at least one example embodiment, a network element may include a processor, the network element being programmed such that the processor executes operations for facilitating coordinated multi-point communication (CoMP) in a wireless communications network including at least a first base station (BS) and a second BS, the network element being the second BS, a plurality of user equipment (UEs) being associated with the second BS, the operations including, receiving, from the first BS, a status request message requesting the second BS to report one or more types of status information, the status request message including at least one of an aggregation indicator and conditional reporting indicator, the aggregation indicator being an indicator that specifies whether the second BS is to report individual measurements or aggregated measurements to the first BS, the conditional reporting indicator being an indicator that indicates to the second BS to report measurements corresponding to the one or more types of resource status information to the first BS only when one or more first conditions are met, selecting one or more UEs, from among the plurality of UEs, based on the report control information, generating a status response message based on measurements corresponding only to the selected one or more UEs, and sending the status response message to the first BS.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
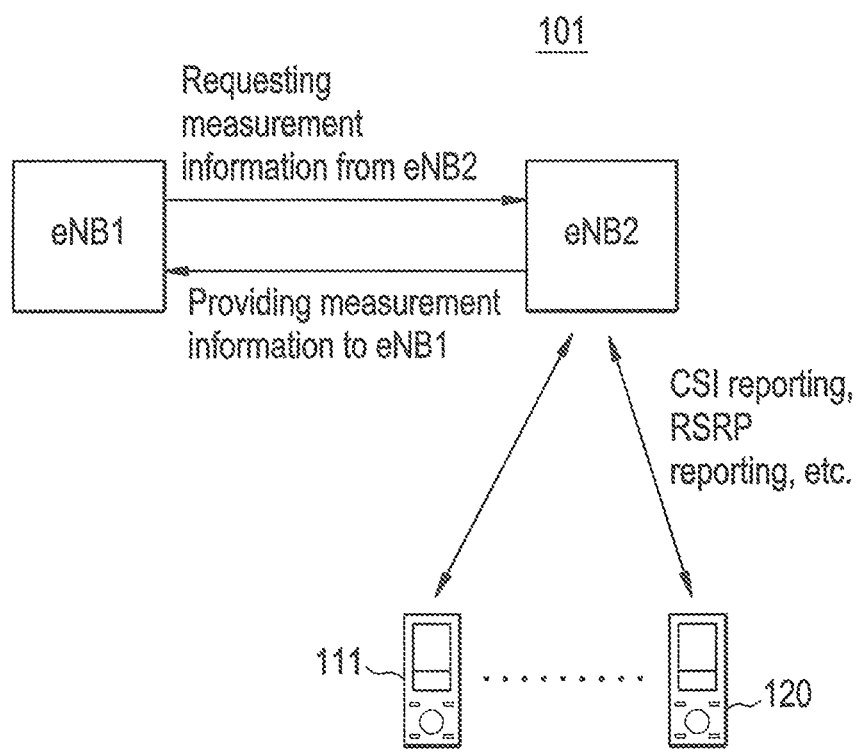
FIG. 1 illustrates a portion of a wireless communication network according to at least one example embodiment.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a access terminal, terminal, mobile, mobile unit, mobile station, mobile user, subscriber, user, remote station, receiver, etc., and may describe a remote user of wireless resources in a wireless communication network. The term evolved Node B (eNB) may be considered synonymous to and/or referred to as an access point (AP), a base station (BS), base transceiver station (BTS), NodeB, etc., and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware including one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

As is stated above, in order for a coordinated multi-point (CoMP) communications coordinating node to make proper decision about scheduling constraints it is desirable for the coordination node to know a substantial amount of information about the UEs and cells being coordinated. However, the transfer of large amounts of resource status information from a reporting eNB to the coordinating node may lead to a potentially high cost with respect to backhaul resources and product complexity. For example, if a reporting eNB has the latest channel state information of a UE, but the UE is associated with an empty data buffer or low priority, then the CSI of the UE is less relevant for coordinated scheduling (from the coordination node point of view) than the CSI of a UE for which there is more data to be transmitted or which has a higher priority.

Consequently, if all UE-specific and cell-specific information are signaled without qualification from a coordinated (or responding) eNB to a coordinator (or requesting) eNB, the signaling overhead between the eNBs may be unnecessarily large. Moreover, some implementations of CoMP may be proprietary and may require different requirements of signaling exchanged between the requesting eNB and the responding eNB.

Consequently, it may be desirable to develop a design for a signaling exchanging mechanism that is compact but also flexible enough to support the implementation and product differentiation without serious loss of information while exchanging.

Overview of Network Architecture and Apparatus Structure

FIG. 1 illustrates a portion of a network 101. The network 101 is a wireless communications network. The network 101 may include, for example, long term evolution (LTE) radio access technology. Referring to FIG. 1, the network 101 includes a plurality of eNBs including a first eNB eNB1 and a second eNB eNB2. The first and second eNBs, eNB1 and eNB2, provide UEs attached to eNB1 and eNB2 with bi-directional access to a core wireless communications network (not pictured). Though only two eNBs are illustrated in FIG. 1, the network 101 may include any number of eNBs, each of which may control one or more cells to which any number of UEs may be attached. Each of the eNBs in network 101 may be in communication with several UEs attached to the eNB. For example, first through tenth UEs 111-120 are attached to the second eNB eNB2.

The network 101 implements a CoMP scheme in which a requesting eNB requests resource status information from a responding eNB so the requesting eNB can use the information learned from the responding eNB to implement scheduling restraints that will result in improved performance for at least one of requesting eNB, the responding eNB and the network 101 overall.

Figure 2:
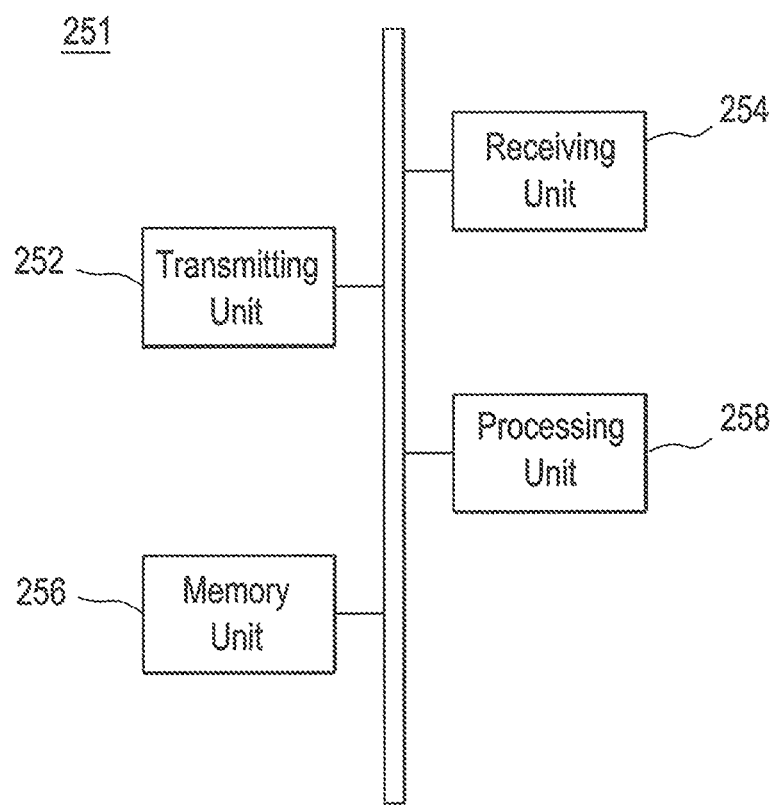
FIG. 2 is a diagram illustrating an example structure of an evolved Node-B (eNB) according to at least one example embodiment.

FIG. 2 is a diagram illustrating an example structure of the eNB 251. Any eNB described herein, including the first and second eNBs eNB1 and eNB2, may have the structure and operation of the eNB 251 described below. Referring to FIG. 2B, the eNB 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to other network element.

The receiving unit 254 is a device that includes hardware and any necessary software for receiving wireless signals including, for example, control signals or data signals via one or more wired and/or wireless connections to other network elements.

The memory unit 256 may be any device capable of storing data including magnetic storage, flash storage, etc.

The processing unit 258 may be any device capable of processing data including, for example, a processor. As used herein, the term 'processor' refers to a machine that is structurally configured to carry out specific operations, or structurally configured to execute instructions included in computer readable code including, for example, code stored in the memory unit 256. Examples of the above-referenced processor include, but are not limited to, a microprocessor, a multiprocessor, a central processing unit (CPU), a digital signal processor (DSP), an application specific integrated circuit (ASIC), and a field programmable gate array (FPGA).

According to at least one example embodiment, any operations described herein, for example with reference to any of FIGS. 1-4, as being performed by an eNB (e.g., either of the first eNB eNB1 and the second eNB eNB2, or any other eNB), may be performed by an eNB having the structure of the eNB 251 illustrated in FIG. 2B. For example, according to at least one example embodiment, the eNB 251 may be programmed, in terms of software and/or hardware, to perform any or all of the functions described herein as being performed by an eNB.

Examples of the eNB 251 being programmed, in terms of software, to perform any or all of the functions described herein as being performed by an eNB will now be discussed below. For example, the memory unit 256 may store a program including executable instructions corresponding to any or all of the operations described with reference to FIGS. 1-4 as being performed by an eNB. According to at least one example embodiment, additionally or alternatively to being stored in the memory unit 256, the executable instructions may be stored in a computer-readable medium including, for example, an optical disc, and the eNB 251 may include hardware for reading data stored on the computer readable-medium. Further, the processing unit 258 may be a processor configured to perform any or all of the operations described with reference to FIGS. 1-4 as being performed by an eNB, for example, by reading and executing the executable instructions stored in at least one of the memory unit 256 and a computer readable storage medium loaded into hardware included in the eNB 251 for reading computer-readable mediums.

Examples of the eNB 251 being programmed, in terms of hardware, to perform any or all of the functions described herein as being performed by an eNB will now be discussed below. Additionally or alternatively to executable instructions corresponding to the functions described with reference to FIGS. 1-4 as being performed by an eNB being stored in a memory unit or a computer-readable medium as is discussed above, the processing unit 258 may include a circuit that has a structural design dedicated to performing any or all of the operations described with reference to FIGS. 1-4 as being performed by an eNB. For example, the above-referenced circuit included in the processing unit 258 may be a FPGA or ASIC physically programmed to perform any or all of the operations described with reference to FIGS. 1-4 as being performed by an eNB.

Selective signaling information sharing according to at least some example embodiments will now be discussed in greater detail below.

Overview of Examples of Requesting and Providing Selective Signaling Information First, examples of techniques which may be used to reduce the amount of signalling necessary to implement CoMP communications will now be discussed below. Following the example techniques, example methods for requesting and providing selective signalling information will be described in greater detail with reference to FIGS. 3 and 4.

In the example techniques discussed below and the example methods discussed with reference to FIGS. 4 and 5, the first eNB eNB1 will serve as an example of the requesting eNB and the second eNB eNB2 will serve as an example of the responding eNB. However, according to at least one example embodiment, any eNB in the network 101 may be a requesting eNB or a responding eNB, or both.

In the example techniques discussed below and the example methods discussed with reference to FIGS. 4 and 5, a modified version of the known 'Resource Status Request' message is used as an example of the message which the requesting eNB eNB1 may send to the responding eNB eNB2 to request resource status information. However, according to at least one example embodiment, a newly defined message type separate from the existing 'Resource Status Request' may be used.

Further, in the example techniques discussed below and the example methods discussed with reference to FIGS. 4 and 5, a modified version of the known 'Resource Status Update' message is used as an example of the message which the responding eNB eNB2 may send to the requesting eNB eNB1 to report resource status information in response to a Request Status Request message. However, according to at least one example embodiment, a newly defined message type separate from the existing 'Resource Status Update' may be used.

Further, in the example techniques discussed below and the example methods discussed with reference to FIGS. 4 and 5, it is assumed that the modified Resource Status Update and/or Resource Status Request messages are sent between the requesting and responding eNBs eNB1 and eNB2 through a known interface including, for example, the X2 interface. However, according to at least one example embodiment, a newly defined interface type separate from the existing X2 interface may be used.

Modifying the Resource Status Request Message to Facilitate Expanded Status Information Type Selection and Conditional Status Reporting According to at least one example embodiment, a requesting UE can selectively choose the type or types of resource status information to include in the CoMP signalling sent from the responding eNB eNB2 to the requesting eNB eNB1, and/or conditions that must be met before CoMP signalling is sent from the responding eNB eNB2 to the requesting eNB eNB1.

Consequently, the responding eNB eNB2 will have fewer Resource Status Update messages to send, and the requesting eNB eNB1 will have fewer Resource Status Update messages to receive and process. Thus, the amount of network resources used by the network 101 in connection with implementing CoMP may be reduced.

Techniques for expanding the types of resource status information an eNB can request according to at least one example embodiment will now be discussed below.

A conventional Resource Status Request message may include, for example, the following parameters:

Message Type,
eNB1 Measurement ID,
eNB2 Measurement ID,
Registration Request,
Report Characteristics,
Cell To Report,
Reporting Periodicity, and
Partial Success Indicator.

A conventional 'Report Characteristics' parameter may include a bitmap including bits corresponding to specific types of resource information the requesting eNB eNB1 wishes to receive from the responding eNB eNB2.

The resource information types represented in the bitmap of the 'Report Characteristics' parameter may include, for example, the following types:
Cell ID,
Hardware Load Indicator,
S1 TNL Load Indicator,
Radio Resource Status,
Composite Available Capacity Group, and
ABS Status.

According to at least one example embodiment, the conventional Resource Status Request message may be modified such that the bitmap of Report Characteristics parameter includes one or more additional bits corresponding to other information types, in addition to those listed above, that the requesting eNB eNB1 may request. The additional bits include for example, a bit corresponding to a precoding matrix indicator (PMI). Another example of an additional bit is a bit corresponding to multiple measurement objects. For example, one additional bit may corresponding to a request from the requesting eNB eNB1 to receive full CSI reporting including PMI, channel quality indicator (CQI) and rank indicator (RI).

Techniques for allowing the requesting eNB eNB1 to indicate the conditions under which the responding eNB eNB2 reports resource status information will now be discussed below.

Alternatively or in addition to modifying the conventional Resource Status Request message to allow for additional resource status data types to be requested as discussed above, according to at least one example embodiment, the conventional Resource Status Request message may be further modified to include an additional parameter that specifies conditions which must be met before the responding eNB eNB2 reports CoMP signalling including certain resource status information. For example, the conventional Resource Status Request message may be further modified to include a 'Condition to Reporting' parameter.

According to at least one embodiment, the Condition to Reporting parameter includes a bit map like that of the Report Characteristics parameter discussed above. Consequently, the bitmap of the Condition to Reporting parameter may include an entry for each of the above-referenced resource information types.

According to at least one example embodiment, a bit for a particular resource information type being set in both the bitmap for the Report Characteristics parameter and the bitmap for the Condition to Reporting parameter in a Resource Status Request message indicates that the particular resource information type is to be reported by the responding eNB eNB2 only if a particular condition is met. According to at least one example embodiment, the conditions may be pre-defined, for example by a wireless communications standard, or defined in accordance with the preferences of an operator of the network 101 for each type of resource information. According to at least one example embodiment, the conditions may defined by a wireless communications standard or the operator separately for each type of resource information. Examples of conditions will be discussed in greater detail below.

According to at least one example embodiment, a bit for a particular resource information type being set in the bitmap for the Report Characteristics parameter, and not being set in the bitmap for the Condition to Reporting parameter in a Resource Status Request message indicates that the particular resource information type is to be reported by the responding eNB eNB2 without regard to the particular condition being met.

According to at least one example embodiment, a bit for a particular resource information type not being set in the bitmap for the Report Characteristics parameter indicates that the particular resource information type is not to be reported by the responding eNB eNB2, regardless of how the bit for the particular resource information type is set in the Condition to Reporting parameter.

The following are examples of conditions which may be applied to resource status information reported by a responding eNB as a result of the Condition to Reporting parameter. The UEs discussed in the examples below may be, for example, UEs that are attached to at least one of the cells controlled by the responding eNB eNB2.

UE-specific conditional CSI reporting examples:

The eNB2 may be requested to report measurements indicated by the Report Characteristics parameter only for UEs that have CSI measurements equal to a specific PMI or within a specific set of PMIs.

The eNB2 may be requested to report measurements indicated by the Report Characteristics parameter only for UEs that have CQI measurements above a reference CQI threshold.

The eNB2 may be requested to report measurements indicated by the Report Characteristics parameter only for UEs having CQI measurements within a reference range of values.

The eNB2 may be requested to report only PMIs for which the aggregated bandwidth demand (i.e., sum of the bandwidth demand from all UEs that can be scheduled using the same precoder) is higher than a bandwidth threshold.

UE-specific conditional RSRP reporting examples:

The eNB2 may be requested to report measurements indicated by the Report Characteristics parameter only for UEs having serving cell reference signal receive power (RSRP) measurements that are higher than a RSRP threshold. A serving cell RSRP value of a UE may be an RSRP value measured by the serving cell of a UE with respect to the UE.

The eNB2 may be requested to report measurements indicated by the Report Characteristics parameter only for UEs that meet the following requirements: the difference between the RSRP measurement of the UE taken by the serving cell of the UE and the second largest RSRP (e.g., an RSRP measurement corresponding to the UE with respect to a cell other than the serving cell of the UE) reporting is within a certain power range.

UE-specific conditional Buffer Status reporting examples:

The eNB2 may be requested to report measurements indicated by the Report Characteristics parameter only for UEs having an amount of data buffered at the eNB2 that is higher than a reference buffer status threshold.

UE specific conditional priority reporting examples:

The eNB2 may be requested to report measurements indicated by the Report Characteristics parameter only for UEs having priority values higher than a reference threshold. For example, the priority value of a UE can be a quality of service (QoS)-related parameter of the UE which includes or is determined by proportionally fair (PF) metric, UE throughput, delay requirement, QoS class identifier (QCI), allocation and retention priority (ARP), and etc.

The eNB2 may be requested to report measurements indicated by the Report Characteristics parameter only for UEs having priority values within a pre-defined value range.

UE-specific conditional perceived throughput reporting examples:

The eNB2 may be requested to report measurements indicated by the Report Characteristics parameter only for UEs having a perceived throughput higher than a threshold value.

UE category conditional reporting examples:

The eNB2 may be requested to report measurements indicated by the Report Characteristics parameter only for $3^{rd}$ Generation Partnership Project (3GPP) Release 11 (Rel 11) UEs, and not for other types of UEs.

The eNB2 may be requested to report measurements indicated by the Report Characteristics parameter only when the percentage of Rel 11 UEs is higher than a threshold.

Though, in some of the conditional reporting examples given above, measurements are described as being reported when the measurements are higher than a threshold value, any desired relationship with the threshold value may be used. For example, measurements may be reported when they are equal to or higher than a threshold value, equal to or less than a threshold value, or less than a threshold value.

Modifying the Resource Status Request and Resource Status Update Messages to Facilitate Aggregated Status Reporting According to at least one example embodiment, a requesting UE can selectively choose between i) requesting the responding eNB eNB2 to report resource status information for each of a plurality of individual UEs associated with the responding eNB eNB2, and ii) requesting the responding eNB eNB2 consolidate resource status information for a plurality of, or alternatively, all, UEs associated with the responding eNB eNB2 and report the consolidated resource status information.

Consequently, the responding eNB eNB2 will have fewer Resource Status Update messages to send, and the requesting eNB eNB1 will have fewer Resource Status Update messages to receive and process. Thus, the amount of network resources used in a wireless communications network implementing CoMP may be reduced.

Alternatively or in addition to modifying the conventional Resource Status Request message to request the responding eNB eNB2 consolidate resource status information for a plurality of, or alternatively, all, UEs associated with the responding eNB eNB2, the conventional Resource Status Request message may be further modified to include an additional parameter that specifies compression or aggregation type which must be executed at the responding eNB eNB2 before the responding eNB eNB2 reports aggregated CoMP signalling. For example, the conventional Resource Status Request message may be further modified to include an "Aggregation Type" parameter.

According to at least one embodiment, the Aggregation Type parameter includes a bit map like that of the Report Characteristics parameter discussed above. Consequently, the bitmap of the Aggregation Type may include an entry for each of the above-referenced resource information types.

According to at least one embodiment, the Aggregation Type parameter may be a single bit applied to all above-referenced resource information types.

According to at least one example embodiment, the Aggregation Type may be pre-defined, for example by a wireless communications standard, or defined in accordance with the preferences of an operator of the network 101 for each type of resource information. According to at least one example embodiment, the Aggregation Type may defined by a wireless communications standard or the operator separately for each type of resource information. Examples of aggregating CoMP signaling will be discussed in greater detail below.

According to at least one example embodiment, a bit for a particular resource information type being set in the bitmap for the Report Characteristics parameter, and not being set in the bitmap or a single bit for the Aggregation Type parameter in a Resource Status Request message indicates that the particular resource information type is to be reported by the responding eNB eNB2 at per UE level without aggregation.

According to at least one example embodiment, a bit for a particular resource information type not being set in the bitmap for the Report Characteristics parameter indicates that the particular resource information type is not to be reported by the responding eNB eNB2, regardless of how the bit for the particular resource information type is set in the Aggregation Type parameter.

Techniques for allowing the requesting eNB eNB1 to request the responding eNB eNB2 report aggregated resource status information will now be discussed below.

A conventional Resource Status Update message may include, for example, the following elements:
Message Type,
eNB1 Measurement ID,
eNB2 Measurement ID, and
Cell Measurement Result.

Each Cell Measurement Result Item may include the following entries:
Cell ID,
Hardware Load Indicator,
S1 TNL Load Indicator,
Radio Resource Status,
Composite Available Capacity Group, and
ABS Status.

According to at least one example embodiment, the bit or bitmap of the Aggregation Type indicator indicates whether or not the requested resource information should be provided by the responding eNB2 in the form of individual resource statuses, or measurement, for each UE or in the form of aggregated information representing the resource statuses, or measurements, of several UEs. whereas an example, if the requesting eNB eNB1 sets the an Aggregation Type indicator bit to '1', the responding eNB eNB2 will report aggregated resource status information, and if the requesting eNB eNB1 sets an Aggregation Type indicator bit to '0', the responding eNB eNB2 will report individual, non-aggregated resource status information corresponding to each UE for which status information is being reported by the responding eNB. As is discussed above, if the Aggregation Type indicator is a bitmap as opposed to a single bit, then the aggregation type of each resource status information type may be set independently.

According to at least one example embodiment, the conventional Resource Status Update message is modified to include aggregate status information. The following are examples of aggregating resource status information according to at least one example embodiment. In the examples below, measurements are described as being provided for UEs that meet all reporting criteria. Examples of reporting criteria include the conditions discussed above with reference to the Condition to Reporting parameter of the modified Resource Status Request message according to at least one example embodiment. Further, the UEs discussed in the examples below may be, for example, UEs that are attached to at least one of the cells controlled by the responding eNB eNB2.

UE-specific aggregated priority reporting examples:

The eNB2 may only report one or more averages of priority measurements, respectively, for one or more groups of UEs which satisfy all reporting criteria. For example, if the responding eNB eNB2 has 100 UEs attached to cells controlled by the responding eNB eNB2, and the 100 UEs satisfy the reporting criteria, the eNB2 may report only an average priority value which is the average of the priority values of all 100 UEs, instead of reporting the individual priority values of all 100 UEs. Alternatively, the responding eNB eNB2 may divide the 100 UEs into groups including, for example four groups of 25 UEs, and report only four priority measurement averages corresponding, respectively, to the four groups of UEs.

The eNB2 may only report distributions of priority measurements corresponding, respectively, to one or more groups of UEs which satisfy all reporting criteria. For example, if the responding eNB eNB2 has 80 high priority UEs and 120 low priority UEs that are attached to cells controlled by the responding eNB eNB2 and satisfy all reporting criteria, the eNB2 may report only a priority distribution (e.g., 40% high priority/60% low priority) instead of reporting the individual priority values of all 200 UEs attached to cells controlled by the eNB2. Further, according to at least one example embodiment, the eNB2 may divide the 200 UEs into groups including, for example 4 groups of 50 UEs, and report only 4 priority distributions corresponding to the 4 groups of UEs.

According to at least one example embodiment, the UEs may be divided into groups based on, for example, the cells to which the UEs are attached.

Each of the aggregated reporting examples discussed herein may aggregate information for all UEs associated with the responding eNB2 as a whole or in groups in the same manner discussed above with respect to the aggregated priority measurement reporting examples.

UE-specific aggregated CSI reporting examples:

The eNB2 may only report one wideband PMI measurement of UEs that satisfy all reporting criteria.

The eNB2 may only report one wideband CQI measurement corresponding to the UEs which satisfy all reporting criteria.

The eNB2 may only report one or more averaged CQI measurements respectively for one or more groups of UEs which satisfy all reporting criteria.

UE-specific aggregated RSRP reporting examples:

The eNB2 may only report one or more averaged serving cell RSRP measurements respectively for one or more groups of UEs which satisfy all reporting criteria. A serving cell RSRP value of a UE may be an RSRP value measured by the serving cell of a UE with respect to the UE.

The eNB2 may only report the one or more largest RSRP measurements from among the RSRP measurements of UEs that satisfy all reporting criteria.

UE-specific aggregated Buffer Status reporting examples:

The eNB2 may only report one or more averages of Buffer Statuses, respectively, for one or more groups of UEs which satisfy all reporting criteria.

The eNB2 may only report one or more sums of Buffer Statuses, respectively, for one or more groups of UEs which satisfy all reporting criteria.

UE-specific aggregated perceived throughput reporting examples:

The eNB2 may only report one or more sums or the averages of perceived throughput measurements, respectively, for one or more groups of UEs which satisfy all reporting criteria;

The eNB2 may only report one or more distributions of perceived throughput measurements for one or more groups of UEs which satisfy all reporting criteria;

UE category aggregated reporting examples:

The eNB2 may only report one or more distributions of UE categories, respectively, for one or more groups of UEs which satisfy all reporting criteria.

Example methods for requesting and providing selective signalling information will now be described in greater detail with reference to FIGS. 3 and 4.

Example Methods for Requesting and Providing Selective Signalling Information

Figure 3:
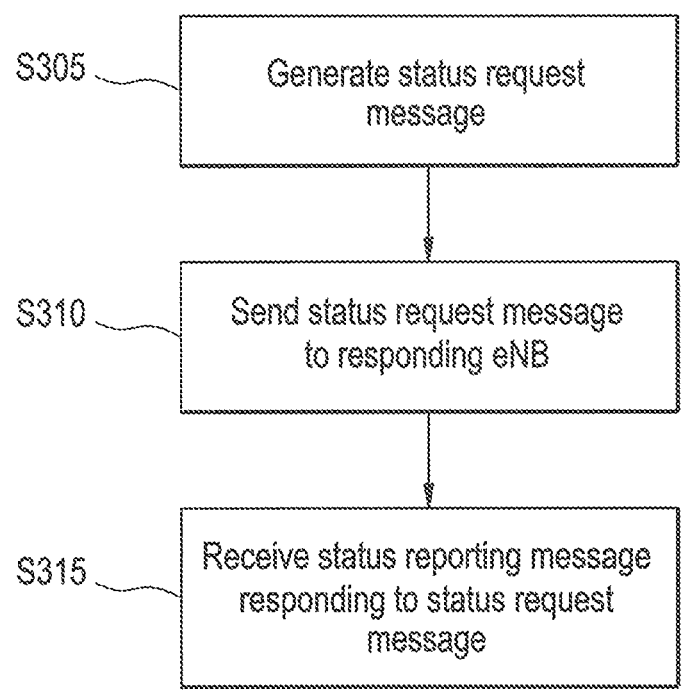
FIG. 3 illustrates an example method for generating a status request message that selectively requests status information from a responding eNB according to at least one example embodiment.

FIG. 3 illustrates an example method for generating a status request message that selectively requests status information from a responding eNB according to at least one example embodiment.

Referring to FIG. 3, in step S305, the requesting eNB eNB1 generates a status request message. For example, in the manner discussed above, the requesting eNB eNB1 may generate, as the status request message, a modified Resource Status Request message including Report Characteristics bitmap indicating the types of resource information the requesting eNB eNB1 wishes to receive from the responding eNB2, and a Condition to Reporting bitmap indicating the resource information types that are to be reported by the responding eNB eNB2 only if certain conditions are met. Further, as is discussed above, according to at least one example embodiment, the status request message generated in step S305 may include the Aggregation Type bit or bitmap specifying whether the responding eNB eNB2 should report the requested status information in the form of individual measurements corresponding to individual UEs or aggregate measurements for one or more groups of UEs.

In step S310, the requesting eNB eNB1 sends the status request message to the responding eNB eNB2. For example, the requesting eNB eNB1 may send the status request message generated in step S305 in the form of the modified Resource Status Request message discussed above. According to at least one example embodiment, the requesting eNB eNB1 may send the status request message to the responding eNB eNB2 via an X2 interface between the requesting and responding eNBs eNB1 and eNB2.

In step S315, the requesting eNB eNB1 receives a status reporting message from the responding eNB eNB2 in response to the status request message sent in step S315. For example, the requesting eNB eNB1 may receive a status reporting message in the form of the modified Resource Status Update message discussed above. The status reporting message received in step S315 may include only status information corresponding to the status information types specified by the Report Characteristics bitmap included in the status request message sent in step S315. Further, for status information types specified by both the Report Characteristics bitmap and the a Condition to Reporting bitmap, the status reporting message received in step S315 may include status information corresponding to the specified status reporting types only with respect to UEs, from among the UEs attached to a cell controlled by the requesting eNB eNB2, that meet the conditional reporting requirements, examples of which were provided above. As is stated above, the conditional reporting requirement may be set by a wireless communications standard and/or in accordance with the preferences of an operator of the network 101.

Figure 4:
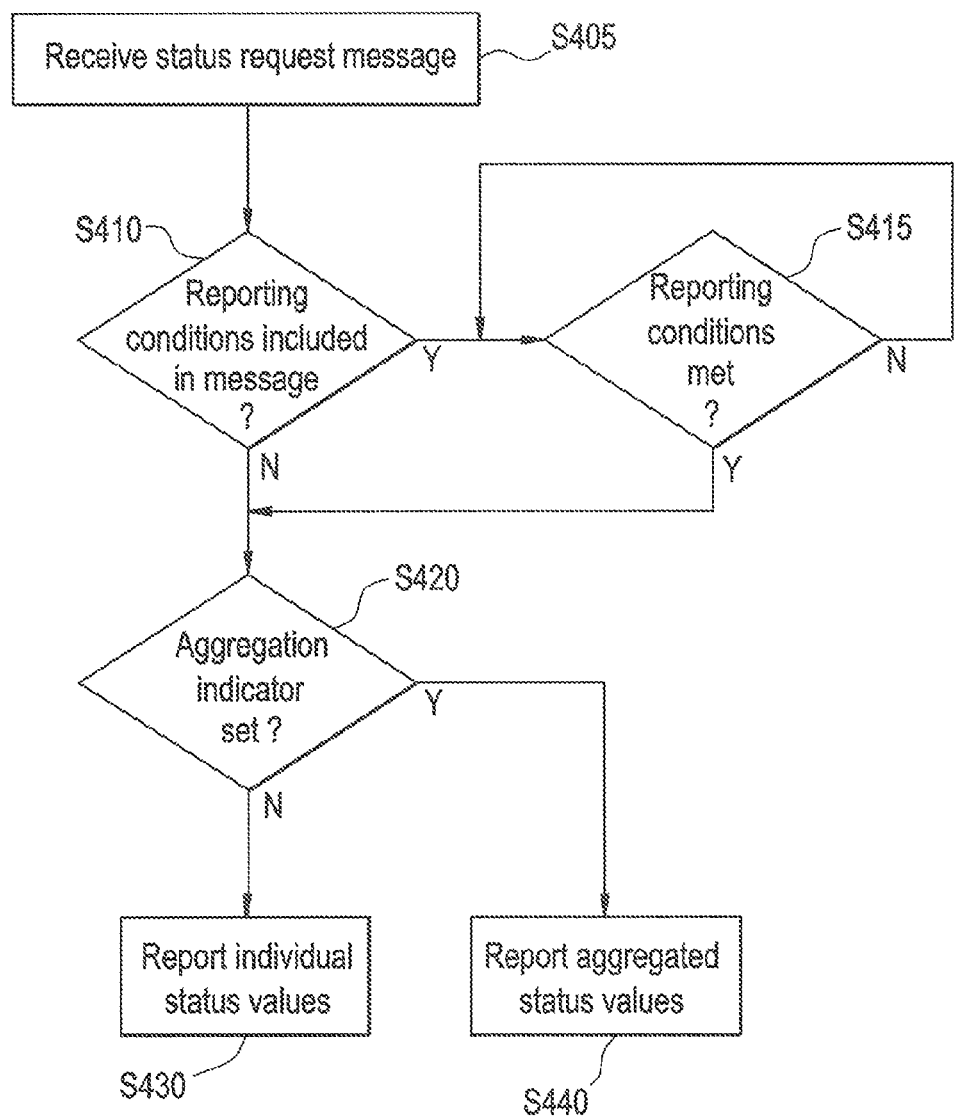
FIG. 4 illustrates an example method for reporting status information to a requesting eNB in response to receiving a status request message that selectively requests status information according to at least one example embodiment.

FIG. 4 illustrates an example method for reporting status information to a requesting eNB in response to receiving a status request message that selectively requests status information.

Referring to FIG. 4, in step S405, the responding eNB eNB2 receives a status request message from the requesting eNB eNB1. For example, the responding eNB eNB2 may receive the status request message in the form of the modified Resource Status request message discussed above. As is discussed above with reference to FIG. 3, the status request message received in step S405 may include any or all of a Report Characteristics bitmap indicating the types of resource information the requesting eNB eNB1 wishes the responding eNB2 to report, a Condition to Reporting bitmap indicating the resource information types that are to be reported by the responding eNB eNB2 only if certain conditions are met, and an Aggregation Type bit or bitmap specifying whether the responding eNB eNB2 should report the requested status information in the form of individual measurements corresponding to individual UEs or aggregate measurements for one or more groups of UEs.

In step S410, the responding eNB eNB2 determines whether or not the status request message received in step S405 includes reporting conditions. For example, the responding eNB eNB2 may determine whether there are any status information types that are specified by both a Report Characteristics bitmap and a Condition to Reporting bitmap included in the status request message received in step S405. If the responding eNB eNB2 determines, in step S410, that reporting conditions are included in the status request message received in step S405, the responding eNB eNB2 proceeds to step S415.

In step S415, the responding eNB eNB2 determines whether or not the reporting conditions corresponding to the status information types for which reporting condition where specified are met. If the conditions are not met, the responding eNB eNB2 waits until the conditions are met. If and when the conditions are met, the responding eNB eNB2 proceeds to step S420. With respect to step S415, according to at least one example embodiment, conditions may be met with respect to a first status information type and not met with respect to a second status information type, in which case the second eNB eNB2 may proceed to step S420 with respect to the first status information type while remaining at step S415 with respect to the second status information type.

Returning to step S410, if the responding eNB eNB2 determines, in step S410, that reporting conditions are not included in the status request message received in step S405, the responding eNB eNB2 proceeds to step S420.

In step S420, the responding eNB eNB2 determines whether or not the status request message received in step 405 includes an Aggregation Type bit that is set or bitmap that includes at least one set bit (e.g. an indicator bit that is set to '1' as opposed to '0'). If the responding eNB eNB2 determines the status request message received in step 405 does not include an Aggregation Type bit that is set or bitmap that includes at least one set bit that is set, the responding eNB eNB2 proceeds to step S430.

In step S430, the responding eNB eNB2 responds to the status request message received in step 405 by sending the requesting eNB eNB1 status report information including individual measurements corresponding to individual UEs attached to cells controlled by the responding eNB eNB2.

Returning to step S420, if the responding eNB eNB2 determines the status request message received in step 405 does include an Aggregation Type bit that is set or bitmap that includes at least one set bit, the responding eNB eNB2 proceeds to step S440.

In step S440, the responding eNB eNB2 responds to the status request message received in step 405 by sending the requesting eNB eNB1 status report information including aggregated measurements corresponding to multiple UEs attached to cells controlled by the responding eNB eNB2. The multiple UEs may include all UEs attached to cells controlled by the responding eNB eNB2. Further the multiple UEs may be divided into groups, and the responding eNB eNB2 can send aggregate information for each group, respectively. Examples of aggregating status report information are discussed above and include, for example, averaging several measurement results.

According to at least one example embodiment, the individual or aggregate measurements included in the status report information sent by the responding eNB eNB2 in either step S430 or step S440 may include only the status information types specified by the status request message, for example by a Report Characteristics bitmap included in the status report request. According to at least one example embodiment, the individual measurements included in the status report information sent by the responding eNB eNB2 in either step S430 or step S440 may include only measurements corresponding to UEs that meet the conditional reporting requirements with respect to status information types specified by the status request message, for example by a Condition to Reporting bitmap included in the status report request.

According to at least one example embodiment, the apparatuses and methods discussed above may result in fewer Resource Status Update messages being sent from requesting eNBs to responding eNBs, and fewer Resource Status Update messages being sent from responding eNBs to requesting eNBs. Thus, the amount of network resources used in a wireless communications network implementing CoMP may be reduced.

Embodiments of the invention being thus described, it will be obvious that embodiments may be varied in many ways. Such variations are not to be regarded as a departure from the invention, and all such modifications are intended to be included within the scope of the invention.

What is claimed:

1. A method of facilitating coordinated multi-point communication (CoMP) in a wireless communications network including at least a first base station (BS) and a second BS, a plurality of user equipment (UEs) being associated with the second BS, the method comprising:
   generating, at a the first BS, a status request message for requesting the second BS to report one or more types of status information, the status request message including at least one of an aggregation indicator and a conditional reporting indicator, the aggregation indicator being an indicator that specifies whether the second BS is to report individual measurements or aggregated measurements to the first BS, the conditional reporting indicator being an indicator that indicates to the second BS to report measurements corresponding to one or more of the one or more types of resource status information to the first BS only when one or more first conditions are met;
   sending the status request message to the second BS; and
   receiving, at the first BS from the second BS, a status response message in response to the sent status request message, the status response message including measurements that conform to the at least one of an aggregation indicator and a conditional reporting indicator.

2. The method of claim 1, wherein the generated status request message includes the conditional reporting indicator, the conditional reporting indicator indicates to the second BS to report only measurements that correspond to UEs, from among the plurality of UEs, that meet the one or more first conditions.

3. The method of claim 2, wherein one of the one or more first conditions is a threshold value or range corresponding to a first information type from among the one of the one or more types of resource status information, and the condition reporting indicator indicates to the second BS to report only measurements of UEs, from among the plurality of UEs, having measurements of the first information type that have a desired relationship with the threshold value or range.

4. The method of claim 1, wherein the generated status request message includes the aggregation indicator, and the aggregation indicator specifies whether the second BS is to report individual measurements corresponding, respectively, to individual UEs, from among the plurality of UEs, or one or more aggregated measurements corresponding, respectively, to one or more groups of UEs, from among the plurality of UEs.

5. The method of claim 4, wherein the aggregation indicator indicates to the second BS to report an aggregated measurement of a first information type from among the one of the one or more types of resource status information, the aggregated measurement being at least one of an average, sum or an statistical value of a plurality of measurements of the first information type, the plurality of measurements corresponding, respectively, to a group of UEs from among the plurality of UEs.

6. The method of claim 1, wherein the wireless communications network includes long term evolution (LTE) radio access technology, the first and second BSs are evolved Node-Bs (eNBs), and the sending the status request message includes sending the status request message from the first eNB to the second eNB through an X2 link.

7. A method of facilitating coordinated multi-point communication (CoMP) in a wireless communications network including at least a first base station (BS) and a second BS, a plurality of user equipment (UEs) being associated with the second BS, the method comprising:
    receiving, at the second BS from the first BS, a status request message requesting the second BS to report one or more types of status information, the status request message including at least one of an aggregation indicator and conditional reporting indicator, the aggregation indicator being an indicator that specifies whether the second BS is to report individual measurements or aggregated measurements to the first BS, the conditional reporting indicator being an indicator that indicates to the second BS to report measurements corresponding to the one or more types of resource status information to the first BS only when one or more first conditions are met;
    selecting one or more UEs, from among the plurality of UEs, based on the at least one of an aggregation indicator and a conditional reporting indicator;
    generating, at the second BS, a status response message based on measurements corresponding only to the selected one or more UEs; and
    sending the status response message from the second BS to the first BS.

8. The method of claim 7, wherein the received status request message includes the conditional reporting indicator, and the selecting one or more UEs includes selecting only one or more UEs, from among the plurality of UEs, that meet the one or more first conditions.

9. The method of claim 8, wherein one of the one or more first conditions is a threshold value or range corresponding to a first information type from among the one of the one or more types of resource status information, and the selecting one or more UEs includes selecting only one or more UEs, from among the plurality of UEs, having measurements of the first information type that have a desired relationship with the threshold value or range.

10. The method of claim 7, wherein the received status request message includes the aggregation indicator, and the generating the status response message includes the second BS selecting between including, in the generated status report, individual measurements corresponding, respectively, to individual UEs, from among the plurality of UEs, and including, in the generated status report, one or more aggregated measurements corresponding, respectively, to one or more groups of UEs, from among the plurality of UEs, the selection being based on the aggregation indicator.

11. The method of claim 10, wherein, based on the aggregation indicator, the generating a status response message includes including, in the status response message, an aggregated measurement of a first information type from among the one of the one or more types of resource status information, the aggregated measurement being at least one of an average, sum, or statistical value of a plurality of measurements of the first information type, the plurality of measurements corresponding, respectively, to a group of UEs from among the plurality of UEs.

12. The method of claim 7, wherein the wireless communications network includes long term evolution (LTE) radio access technology, the first and second BSs are evolved Node-Bs (eNBs), and the sending the status response message includes sending the status response message from the second eNB to the first eNB through an X2 link.

13. A network element comprising:
    a processor, the network element being programmed such that the processor executes operations for facilitating coordinated multi-point communication (COMP) in a wireless communications network including at least a first base station (BS) and a second BS, the network element being the first BS, a plurality of user equipment (UEs) being associated with the second BS, the operations including,
        generating a status request message for requesting the second BS to report one or more types of status information, the status request message including at least one of an aggregation indicator and conditional reporting indicator, the aggregation indicator being an indicator that specifies whether the second BS is to report individual measurements or aggregated measurements to the first BS, the conditional reporting indicator being an indicator that indicates to the second BS to report measurements corresponding to the one or more types of resource status information to the first BS only when one or more first conditions are met,
        sending the status request message to the second BS, and
        receiving, from the second BS, a status response message in response to the sent status request message, the status response message including only measurements that conform to the at least one of an aggregation indicator and a conditional reporting indicator.

14. The first BS of claim 13, wherein first BS is programmed to generate the status request message such that the status request message includes the conditional reporting indicator, and the conditional reporting indicator indicates to the second BS to report only measurements that correspond to UEs, from among the plurality of UEs, that meet the one or more first conditions.

15. The first BS of claim 13, wherein first BS is programmed to generate the status request message such that the status request message includes the aggregation indicator, and the aggregation indicator specifies whether the second BS is to report individual measurements corresponding, respectively, to individual UEs, from among the plurality of UEs, or one or more aggregated measurements corresponding, respectively, to one or more groups of UEs, from among the plurality of UEs.

16. A network element comprising:
a processor, the network element being programmed such that the processor executes operations for facilitating coordinated multi-point communication (CoMP) in a wireless communications network including at least a first base station (BS) and a second BS, the network element being the second BS, a plurality of user equipment (UEs) being associated with the second BS, the operations including,
receiving a status request message requesting the second BS to report to the first BS one or more types of status information, the status request message including at least one of an aggregation indicator and conditional reporting indicator, the aggregation indicator being an indicator that specifies whether the second BS is to report individual measurements or aggregated measurements to the first BS, the conditional reporting indicator being an indicator that indicates to the second BS to report measurements corresponding to the one or more types of resource status information to the first BS only when one or more first conditions are met,
selecting one or more UEs, from among the plurality of UEs, based on the report control information,
generating a status response message based on measurements corresponding only to the selected one or more UEs, and
sending the status response message to the first BS.

17. The second BS of claim 16, wherein the second BS is programmed such that, if the received status request message includes the conditional reporting indicator, all the one or more UEs selected by the second BS meet the one or more first conditions.

18. The second BS of claim 17, wherein the second BS is programmed such that, if the received status request message includes the conditional reporting indicator and one of the one or more first conditions is a threshold value or range corresponding to a first information type from among the one of the one or more types of resource status information, all the one or more UEs selected by the second BS have measurements of the first information type that have a desired relationship with the threshold value or range.

19. The second BS of claim 16, wherein the second BS is programmed such that, if the received status request message includes the aggregation indicator, the second BS generates the status response message by selecting between including, in the status response message, individual measurements corresponding, respectively, to individual UEs, from among the plurality of UEs, and including, in the status response message, one or more aggregated measurements corresponding, respectively, to one or more groups of UEs, from among the plurality of UEs, the selection being based on the aggregation indicator.

20. The second BS of claim 19, wherein the second BS is programmed such that, if the received status request message includes an aggregation indicator that indicates to the second BS to generate an aggregated measurement, the second BS generates the status response message by including, in the status response message, an aggregated measurement of a first information type from among the one or more types of resource status information, the aggregated measurement being at least one of an average, sum or statistical value of a plurality of measurements of the first information type, the plurality of measurements corresponding, respectively, to a group of UEs from among the plurality of UEs.

* * * * *